(12) United States Patent
Masuda et al.

(10) Patent No.: US 7,298,443 B2
(45) Date of Patent: Nov. 20, 2007

(54) OPTICAL COMPENSATING FILM, POLARIZING PLATE AND A LIQUID CRYSTAL DISPLAY USING THE SAME

(75) Inventors: Tomoaki Masuda, Ibaraki (JP); Takashi Yamaoka, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 10/006,790

(22) Filed: Dec. 4, 2001

(65) Prior Publication Data

US 2003/0103180 A1   Jun. 5, 2003

(51) Int. Cl.
*G02F 1/1335* (2006.01)

(52) U.S. Cl. .......... 349/117; 349/112

(58) Field of Classification Search ........ 349/122, 349/117–119, 112
See application file for complete search history.

(56) References Cited

U.S. PATENT DOCUMENTS

| | | | |
|---|---|---|---|
| 4,292,370 A * | 9/1981 | Pekko | 428/355 N |
| 5,310,439 A * | 5/1994 | Matsui et al. | 156/307.3 |
| 5,543,948 A * | 8/1996 | Takahashi et al. | 349/117 |
| 5,568,290 A * | 10/1996 | Nakamura | 349/96 |
| 5,725,960 A * | 3/1998 | Konishi et al. | 428/451 |
| 6,417,904 B1 * | 7/2002 | Yamaoka et al. | 349/117 |
| 6,475,714 B2 * | 11/2002 | Arimoto et al. | 430/529 |

FOREIGN PATENT DOCUMENTS

| | | | |
|---|---|---|---|
| JP | 4-283245 | | 10/1992 |
| JP | 05-086211 | * | 4/1993 |
| JP | 05212828 | * | 8/1993 |
| JP | 9-24966 | | 1/1997 |
| JP | 09151627 | * | 6/1997 |
| JP | 10-221501 | | 8/1998 |
| JP | 000082338 | * | 3/2000 |
| WO | WO 92/22002 | * | 12/1992 |

* cited by examiner

*Primary Examiner*—Dung T. Nguyen
(74) *Attorney, Agent, or Firm*—Westerman, Hattori, Daniels & Adrian LLP

(57) ABSTRACT

An optical compensating film using a norbornene-based resin film in which the durability at an interface surface of the adhesive of a LCD is improved, a polarizing plate, and a liquid crystal display using the same is provided. The optical compensating film of the present invention is formed by coating an adhesive on a stretched norbornene-based resin film. In the optical compensating film, the adhesive force between the optical compensating film and the adhesive layer is 10 N/20 mm or more.

12 Claims, 2 Drawing Sheets

OPTICAL COMPENSATING FILM, POLARIZING PLATE AND A LIQUID CRYSTAL DISPLAY USING THE SAME

BACKGROUND OF INVENTION

The present invention relates to an optical compensating film in which a contrast, a display color and a visual property of a liquid crystal display (LCD) are significantly improved, and which has a further enhanced durability and ease in handling; an elliptical polarizing plate; and a liquid crystal display using the same.

Recently, LCDs used for, for example, personal computers have increased sharply. Application for LCDs has broadened. Recently, such LCDs are used for monitoring as well.

A polarizing plate is manufactured, for example, by dyeing a polyvinyl alcohol (PVA) film with dichroic iodine or a dichroic dyestuff, crosslinking with boric acid, borax, or the like; stretching uniaxially during or before/after dyeing and crosslinking; and then usually drying with the use of a dryer etc. and sticking to a protective layer such as triacetylcellulose (TAC) by using an adhesive.

For displays of word processors, personal computers, TV monitors, or the like, in liquid crystal displays, conventionally CRTs have been used mainly. However, conventional CRTs are being replaced by liquid crystal displays having an excellent advantage, that is, thin and light and low consumption of electric power, in particular, by active matrix type LCDs having high quality and high response rate.

Furthermore, JP10 (1998)-221501 A discloses that since the absolute value of the photoelastic coefficient of a polynorbornene-based resin is smaller by approximately one digit, thus enabling the film to have a low retardation, the polynorbornene-based resin film that was stretched uniaxially is used as a retardation film for compensating the retardation in a liquid crystal display etc.

However, the optical compensating film using the norbornene-based resin film used for this active matrix type LCD has a sufficient durability by itself when such an optical compensating film is incorporated into a liquid crystal display, it is adhered to glass and a polarizing plate via an adhesive. Because of this, there arises a problem in that durability becomes insufficient under adverse environment, for example, in applications for a car, and foaming phenomenon or peeling occurs at an interface surface of the adhesive.

SUMMARY OF INVENTION

It is an object of the present invention to provide an optical compensating film using a norbornene-based resin film whose durability at an interface surface with reference to an adhesive of a LCD is improved; a polarizing plate, and a liquid crystal display using the same.

In order to achieve the above object, an optical compensating film of the present invention includes an adhesive layer formed by coating the adhesive onto a stretched norbornene-based resin film, wherein the adhesive layer has adhesive force of not smaller than 10 N/20 mm.

The norbornene-based resin film is subjected to a surface treatment and thereafter the adhesive layer is preferably formed thereon. It is preferable that this surface treatment is a corona discharge treatment. It is preferable that this discharge frequency is in the range from 50 Hz to 500 kHz and the discharge amount is in the range from 0.001 kV·A·min/m2 to 5 kV·A·min/m2.

It is preferable that the adhesive is an acrylic adhesive because the reliability with respect to a glass adhesion surface is more excellent than that of other adhesives.

In the above optical compensating film, it is preferable that the thickness of the stretched norbornene-based resin film is generally in the range from 20 µm to 200 µm. It is preferable that the stretching ratio of the stretched norbornene-based resin film ranges from 1.01 times to 10 times the original length.

Furthermore, in the polarizing plate of the present invention, the above-mentioned optical compensating film is adhered via the adhesive layer.

Furthermore, in the liquid crystal display of the present invention, the above-mentioned optical compensating film or the above-mentioned polarizing plate is used for at least one side of a liquid crystal cell.

DETAILED DESCRIPTION

Figure 1:
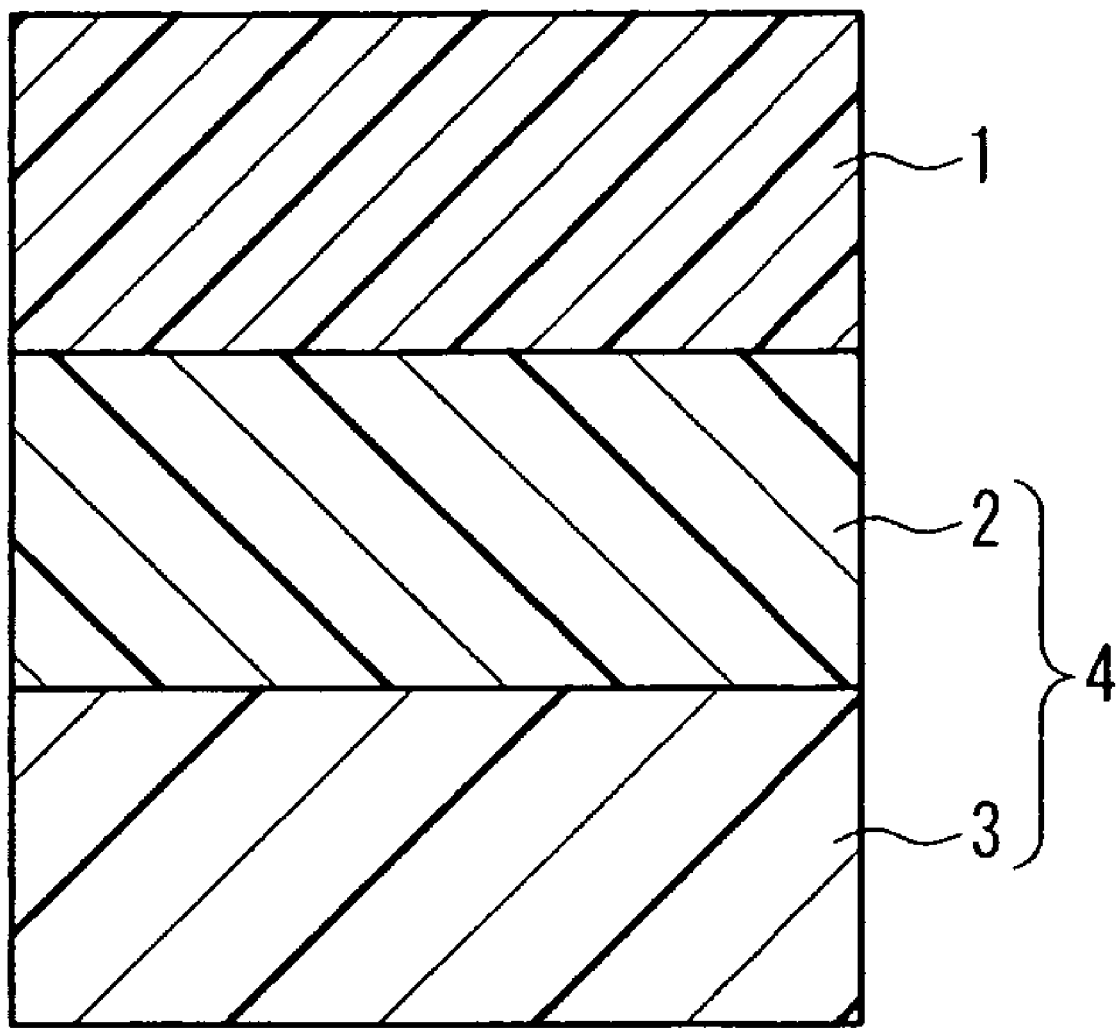
FIG. 1 is a schematic view of a polarizing member having an optical compensating function according to the present invention that includes a polarizing plate 1 and an optical compensating film 4 including an adhesive layer 2 and a norbornene-based resin film 3.
Figure 2:
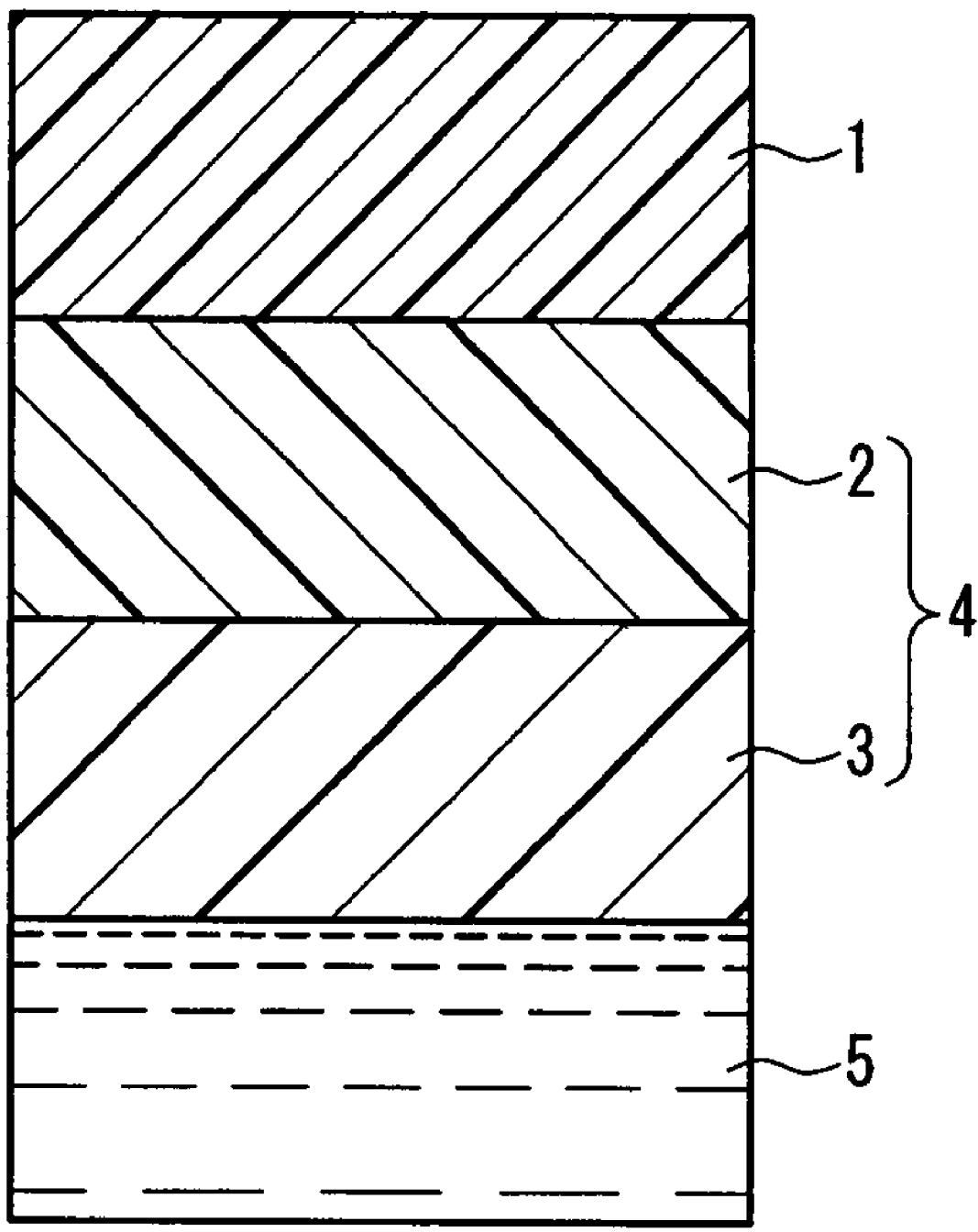
FIG. 2 is a schematic view of a liquid crystal display comprising a polarizing member as shown in FIG. 1 and a liquid crystal cell 5.

According to the present invention, in an optical compensating film comprising an adhesive layer formed by coating the adhesive onto a stretched norbornene-based resin film, the adhesive layer has adhesive force of not smaller than 10 N/20 mm. Thus, in a LCD for displaying a large screen or a LCD requiring the durability, for example, a LCD for vehicle equipment, etc., it is possible to prevent the defective appearance, for example, the occurrence of peeling, wrinkle, etc. On the other hand, if the adhesive force becomes less than 10 N/20 mm, there is a disadvantage that peeling occurs between the norbornene-based resin film and the adhesive layer. The adhesive layer is obtained by coating an adhesive to the thickness, for example, in the range from 20 µm to 25 µm.

Specifically, the stretched norbornene-based resin film is subjected to a corona discharge treatment. In a case where the film is used as an optical compensating film for a liquid crystal display, the film functions as an optical compensating film having an excellent durability in displaying uniformly.

As the norbornene-based resin, there is no particular limitation, and any commercially available resins can be used. Furthermore, a denatured or modified resin may be used.

As the stretched norbornene-based resin film used in the present invention, it is possible to use the above-mentioned norbornene-based resin film, which is stretched by the well-known method, such as uniaxially stretching or biaxial stretching, etc. An example of the uniaxial stretching method includes a method for laterally stretching the film by using a tenter stretching machine, and a method for longitudinally stretching the film by the use of the difference in the velocity of two or more rolls. An example of the biaxial stretching method includes a method for stretching the film also in the direction of width by using a tenter in addition to the uniaxial stretching, and the like. The temperature at the time of stretching may appropriately be selected depending upon the glass transition point (Tg) of a thermoplastic resin to be used or kinds of additives, however, it generally is 80° C. to 250° C., preferably 120° C. to 220° C., and particularly preferably 140° C. to 200° C. Above all, uniaxially stretched orientation film is the most preferable one from the viewpoint of improving the optical axis accuracy easily.

The stretching ratio of the film differs depending upon the retardation to be compensated. However, it is preferable that the non-stretched norbornene-based resin film is stretched at the stretching ratio of 1.01 times to 10 times the original length, and preferably stretching ratio of 1.02 times to 8 times the original length. Furthermore, the commercially available stretched norbornene-based resin film can also be used. An example of the stretched norbornene-based resin includes, for example, "Zeonor film" produced by Nippon Zeon Co., Ltd., "Zeonex film" produced by Nippon Zeon Co., Ltd., "Essina" produced by Sekisui Chemical Co., Ltd., "ARTON film" produced by JSR Co., Ltd. and the like.

The thickness of the stretched norbornene-based resin film is in the range from 20 μm to 200 μm, and preferably in the range from 40 μm to 100 μm. When the film thickness is less than 20 μm, the durability of the film becomes insufficient and the film is difficult to be processed. On the other hand, when the film thickness is more than 200 μm, the transmittance is reduced.

In the optical compensating film used in the present invention, in order to increase the adhesive force between the optical compensating film and the adhesive, the corona discharge treatment is carried out on at least one side of the stretched norbornene-based resin film to improve the surface thereon. The corona discharge treatment is a well-known surface treatment method, and it can be carried out by any one of the conventionally known methods, for example, JP 48-5043 B, JP47-51905 B, JP 47-28067 A, JP 49-83767 A, JP 51-41770 A, JP 51-131576 A, etc. An appropriate discharge frequency is in the range from 50 Hz to 500 kHz, and preferably in the range from 10 kHz to several hundreds kHz. In the treatment strength of the material to be treated is in the range from 0.001 kV·A·min/m2 to 5 kV·A·min/m2, and preferably in the range from 0.01 kV·A·min/m2 to 1 kV·A·min/m2. An appropriate gap clearance between the electrode and the dielectric roll is in the range from 0.5 mm to 2.5 mm, and preferably in the range from 1.0 mm to 2.0 mm.

As the adhesive for coating the stretched norbornene-based resin film, the well-known adhesive, for example, acrylic, silicone-based, polyester-based, polyurethane-based, polyether-based, rubber adhesives, and the like, can appropriately be used. An acrylic adhesive having a low coefficient of moisture absorption and an excellent thermal resistance property is preferable because the foaming phenomenon or the deterioration of the optical property due to the thermal expansion when being attached to the liquid cell substrate, etc. is suppressed. By using the acrylic adhesive, the reliability with respect to a glass adhesion surface becomes more excellent as compared with the case where the other adhesives are used.

Since the optical compensating film of the present invention can function as a half wavelength plate (λ/2 plate) or a quarter wavelength plate (λ/4 plate) by selecting stretching conditions, by adhering the optical compensating film onto the polarizing plate via the adhesive layer, a polarizing plate having an optical compensating function can be formed. There is no particular limitation on the polarizing plate. The basic configuration includes a transparent protective film as a protective layer is adhered on one side or both sides of the polarizer via an appropriate adhesive layer.

As a polarizer (polarizing film), it is possible to use appropriate one that is formed by subjecting an appropriate polyvinyl alcohol polymer film that is known in the prior art, for example, polyvinyl alcohol film, and a partially formalized polyvinyl alcohol film, etc. to appropriate treatments such as dyeing with dichroic substances such as iodine and a dichroic dyestuff, stretching, and crosslinking, etc. in any suitable orders and manners and allows linearly polarized light to pass through the film when natural light enters. In particular, a polarizer with an excellent light transmittance and a polarization degree is preferred.

As a material for the protective film that is a transparent film provided on one side or both sides of the polarizer (polarizing film), any appropriate transparent films can be used. A general example of the polymer includes, but not limited to an acetate-based resin such as triacetylcellulose.

When some factors such as polarizing properties and durability are taken into account, an especially preferable transparent protective film is a triacetylcellulose film having a surface saponified with alkali or the like. Moreover, in the case where a transparent protective film is provided on both surfaces of the polarizing film, the transparent protective films made of different polymers, etc. between the front surface and the rear surface may be used.

The transparent protective film used for the protective layer may be subject to treatments for providing properties such as hard coating, antireflection, anti-sticking, dispersion, or anti-glaring, as long as the purposes of the present invention are not sacrificed. One of the purposes of the hard coating treatment is to prevent scratches on the surfaces of the polarizing plate. It can be formed by, for example, attaching a hardening coating film which is formed with an appropriate ultraviolet hardening resin such as silicon-based ultraviolet hardening resin and has excellent hardness and smoothness, etc.

On the other hand, the antireflection treatment is carried out to prevent reflection of outdoor daylight on the surface of the polarizing plate. It is achieved by, for example, forming an anti-reflection film or the like in a conventional manner. Furthermore, anti-sticking treatment is carried out to prevent adjacent layers from sticking to each other. Anti-glaring treatment is carried out to prevent visibility of light passing through the polarizing plate from being hindered by outdoor daylight reflected on the surface of the polarizing plate. The anti-glaring treatment can be carried out by providing microscopic asperities on a surface of a transparent protective film in an appropriate manner, for example, by roughening the surface by sand-blasting, embossing, etc. by blending transparent particles, or the like.

An example of the above-mentioned transparent fine particles includes silica, alumina, titania, zirconia, stannic oxide, indium oxide, cadmium oxide, antimony oxide, or the like, which have an average particle diameter ranging from 0.5 μm to 20 μm. Inorganic fine particles having electroconductivity may also be used. Alternatively, organic fine particles having crosslinked or uncrosslinked polymer particles, etc. can be used. The amount of the transparent fine particles ranges generally from 2 parts by weight to 70 parts by weight and particularly from 5 parts by weight to 50 parts by weight for 100 parts by weight of the transparent resin.

An anti-glare layer including transparent fine particles can be provided as the transparent protective layer itself or a coating layer applied onto the surface of the transparent protective layer. The anti-glare layer may have a function as a diffusion layer to diffuse light passing through the polarizing plate in order to enlarge viewing angle (this function is referred to as a viewing angle compensating function, etc.). Moreover, the above-mentioned layers such as the antireflection layer, the anti-sticking layer, the diffusion layer, and the anti-glare layer can be provided separately from the transparent protective layer as an optical layer formed with a sheet form including the above-mentioned layers.

There is no specific limitation on a treatment for adhering the polarizer (polarizing film) to the transparent protective film that is a protective layer. However, the adhering treatment can be carried out, for example, by using an adhesive such as an adhesive including a vinyl alcohol-based polymer, or an adhesive including at least a water-soluble crosslinking agent of vinyl alcohol-based polymer such as boric acid, borax, glutaraldehyde, melamine and oxalic acid. Such adhesive layers can be formed as, for example, an applying and drying layer of an aqueous solution. However, in preparation of the aqueous solution, other additives, a catalyst such as an acid can be blended if necessary In a practical use, the polarizing plate of the present invention can be used as an optical member that is laminated to other optical layers. Although there is no specific limitation on this optical layer, one or two or more of appropriate optical layer(s) applicable for formation of a liquid crystal display, etc. can be used. An example of the optical layer includes a reflector, a transreflector, a retardation plate (including a k plate such as a half wavelength plate and a quarter wavelength plate), a viewing angle compensating film, a brightness enhancement film, and the like. A particularly preferable example of the polarizing plate includes a reflective polarizing plate or a semitransparent polarizing plate formed by laminating an additional reflector or a transreflector on the above-mentioned polarizing plate including a polarizer and a protective layer; an elliptical polarizing plate or a circular polarizing plate formed by laminating an additional retardation plate on the above-mentioned polarizing plate including a polarizer and a protective layer; a polarizing plate formed by laminating an additional viewing angle compensating film on the above-mentioned polarizing plate including a polarizer and a protective layer; and a polarizing plate formed by laminating an additional brightness enhancement film on the above-mentioned polarizing plate including a polarizer and a protective layer.

The above-mentioned reflector is explained below. A reflector is provided on a polarizing plate in order to form a reflective polarizing plate. In general, such a reflective polarizing plate is provided on the backside of a liquid crystal cell and is able to form a type of a liquid crystal display which displays by reflecting incident light from a visible side (display side). The reflective polarizing plate has some advantages, for example, light sources such as backlight do not need to be built in, and thus the liquid crystal display can be thinned further.

The reflective polarizing plate can be formed in an appropriate manner such as attaching a reflecting layer made of, for example, a metal on one surface of the polarizing plate via, for example, the above-mentioned transparent protective film as required. A specific example of the reflective polarizing plate includes a reflecting layer formed by attaching a foil of a reflective metal such as aluminum or a vapor deposited film on one surface of the transparent protective film that has been subjected to a matting treatment as required.

Moreover, another example of a reflective polarizing plate includes the above-mentioned transparent protective film having a surface of microscopic asperities due to fine particles contained and a reflecting layer corresponding to the microscopic asperities. The reflecting layer having a surface with microscopic asperities has such an advantage that it diffuses incident light irregularly, so that directivity and glare can be prevented and irregularity in color tones can be controlled. This reflecting layer can be formed by, for example, attaching a metal directly onto a surface of a transparent protective film in any appropriate methods including a vapor deposition such as vacuum deposition, and plating such as ion plating and sputtering.

Moreover, the reflector can be used as, for example, a reflecting sheet formed by providing a reflecting layer onto an appropriate film similar to the transparent protective film, instead of the above-mentioned method of attaching a reflector directly onto the transparent protective film of the polarizing plate. Since the reflecting layer of the reflector is generally made of metal, it is preferably used in a form in which its reflection surface is covered with a film, a polarizing plate, etc, from the view point of the prevention of the reduction of reflectance due to oxidation, long durability of the initial reflectance, avoidance of formation of an additional protective layer, and the like.

Furthermore, under the above configuration, a semitransparent polarizing plate can be obtained by using a semitransparent reflecting layer such as a half mirror, which reflects light and transmits light on the reflecting layer. In general, the semitransparent polarizing plate is provided on the backside of a liquid crystal cell and can form a type of liquid crystal display which displays an image by reflecting incident light from the visible side (display side) when a liquid crystal display, etc. is used in a relatively bright atmosphere, and displays an image by using a built-in light source such as a backlight included in the backside of the semitransparent polarizing plate in a relatively dark atmosphere. In other words, the semitransparent polarizing plate can be used to form a type of a liquid crystal display that can save energy by using a light source such as a backlight etc. under a bright atmosphere, while a built-in light source can also be used under a relatively dark atmosphere.

Next, an elliptical polarizing plate or a circular polarizing plate in which a retardation plate is laminated additionally on the above-mentioned polarizing plate including a polarizer and a protective layer will be explained.

A retardation plate, etc. is used for modifying linearly polarized light to either elliptical polarized light or circular polarized light, modifying elliptical polarized light or circular polarized light to linearly polarized light, or modifying a polarization direction of linearly polarized light. In particular, a retardation plate called a quarter wavelength plate (also called $\lambda/4$ plate) is used for modifying linearly polarized light to circular polarized light, and for modifying circular polarized light to linearly polarized light. A half wavelength plate (also called $\lambda/2$ plate) is generally used for modifying a polarization direction of linearly polarized light.

The elliptical polarizing plate is effectively used in compensating colors (blue or yellow) generated due to birefringence in a liquid crystal layer of a super twist nematic (STN) liquid crystal display so as to provide a black-and-white display without the above-mentioned colors. Furthermore, the elliptical polarizing plate of which three-dimensional refractive index is controlled is further preferred since it can compensate (prevent) colors observed when looking a screen of the liquid crystal display from an oblique direction. The circular polarizing plate is effectively used, for example, in adjusting color tones of an image of a reflective liquid crystal display that has a color image display, and it also serves to prevent reflection.

Specific example of the above-mentioned retardation plate include a birefringent film prepared by stretching a film made from an appropriate polymer, an oriented film of a liquid crystal polymer, and an oriented layer of a liquid crystal polymer that is supported by a film, and the like. Examples of the appropriate polymer include, polycarbonate, polyvinyl alcohol, polystyrene, polymethyl methacrylate, polyolefins such as polypropylene, polyalylate, and polyamide. Furthermore, the incline-oriented film is prepared by, for example, bonding a heat shrinkable film to a polymer film and subjecting the polymer film to a stretching treatment and/or a shrinking treatment under an influence of shrinkage force by heat, or by orienting obliquely a liquid crystal polymer.

Next, the polarizing plate in which a viewing angle compensating film is laminated additionally on the above-mentioned polarizing plate of the present invention including a polarizer and a protective layer will be explained.

The viewing angle compensating film is used for widening a viewing angle so that an image can be seen relatively clearly even when a screen of a liquid crystal display is viewed from a slightly oblique direction instead of from the direction perpendicular to the screen.

As the viewing angle compensating film, a triacetylcellulose film etc. coated with a discotic liquid crystal, or a retardation plate is used. While an ordinary retardation plate is a polymer film having birefringence is stretched uniaxially in the face direction, a retardation plate used as the viewing angle compensating film is a two-way stretched film such as a polymer film having a birefringence stretched biaxially in the face direction, or a bidirectionally stretched film such as an incline-oriented polymer film, which is stretched uniaxially in the face direction and also stretched in the thickness direction and which controls a refractive index in the thickness direction. The incline-oriented film is prepared as mentioned above by, for example, bonding a heat shrinkable film to a polymer film and subjecting the polymer film to a stretching treatment and/or a shrinking treatment under an influence of shrinkage force by heat, or by obliquely orienting a liquid crystal polymer. A polymer as a raw material of the retardation plate is similar to the polymer used for the above-mentioned retardation plate.

The polarizing plate in which the brightness enhancement film is attached to the above-mentioned polarizing plate of the present invention is generally arranged on the backside of a liquid crystal cell. When natural light enters by a backlight of the liquid crystal display etc. or reflection from the backside and the like, the brightness enhancement film reflects linearly polarized light of a predetermined polarizing axis or circularly polarized light in a predetermined direction, while transmitting other light. The polarizing plate in which the brightness enhancement film is laminated on the above-mentioned polarizing plate including a polarizer and a protective layer allows entrance of light from a light source such as a backlight to obtain transmitted light in a predetermined polarization state, while reflecting light other than light in the predetermined polarization state. Light reflected by the brightness enhancement film is reversed through a reflecting layer or the like provided additionally on the backside of the brightness enhancement film, and the reversed light is allowed to re-enter the brightness enhancement plate. The re-entering light is transmitted partly or entirely as light in a predetermined polarization state so as to increase the amount of light passing through the brightness enhancement film and polarized light that is hardly absorbed in the polarizer is supplied so as to improve the brightness by increasing the amount of light available for the liquid crystal display, etc. Therefore, when light enters through a polarizer from the backside of the liquid crystal cell by using a backlight or the like without using any brightness enhancement films, most of the light having a polarization direction inconsistent with the polarization axis of the polarizer is absorbed in the polarizer and is not transmitted by the polarizer. That is to say, even thought it depends on the characteristics of the polarizer used, approximately 50% of light is absorbed in the polarizer, which decreases the quantity of light available for the liquid crystal display or the like and makes the image dark. The brightness enhancement film prevents light having a polarization direction to be absorbed in the polarizer from entering the polarizer to reflect the light on the brightness enhancement film once, and reverses the light through the reflecting layer or the like provided on the backside the brightness enhancement film to make the light re-enter the brightness enhancement plate, repeatedly. Since the brightness enhancement film transmits the polarized light that is reflected and reversed between the brightness enhancement film and the reflecting layer only if the polarized light has a polarization direction to pass the polarizer and provide the polarized light to the polarizer, light from a backlight or the like can be used efficiently for displaying images of a liquid crystal display in order to provide a bright screen.

Appropriate examples of the above-mentioned brightness enhancement film includes a film that transmits a linearly polarized light having a predetermined polarization axis and reflects other light, a multilayer thin film of a dielectric or a multilayer laminate of thin films with varied refraction aeolotropy (D-BEF produced by 3M); a film that reflects either clockwise or counterclockwise circular polarized light while transmitting other light such as a cholesteric liquid crystal layer, more specifically, an oriented film of a cholesteric liquid crystal polymer or an oriented liquid crystal layer supported on a supportive substrate, or the like (PCF350 produced by Nitto Denko Corporation, and Transmax produced by Merck Co., Ltd., etc.).

Therefore, with the type of brightness enhancement film transmitting a linearly polarized light having a predetermined polarization axis, the transmitted light directly enters the polarizing plate with the polarization axes matched, so that absorption loss due to the polarizing plate is controlled and the light can be transmitted efficiently. On the other hand, with the type of the brightness enhancement film transmitting a circular polarized light, such as a cholesteric liquid crystal layer, the transmission circular polarized light is preferably converted into linearly polarized light through a retardation plate so as to control the absorption loss even though the circular polarized light can enter the polarizer directly. Circular polarized light can be converted into linearly polarized light by using a quarter wavelength plate as a retardation plate.

A retardation plate having a function as a quarter wavelength plate in a wide wavelength region of a visible light region can be obtained, for example, by overlapping a retardation layer functioning as a quarter wavelength plate for monochromatic light such as light having 550 nm wavelength and another retardation plate showing a separate optical retardation property such as a retardation plate functioning as a half wavelength plate. Therefore, a retardation plate arranged between a polarizing plate and brightness enhancement film can include a single layer or at least two layers of the retardation layers.

Moreover, as to a cholesteric liquid crystal layer, by combining layers having different reflection wavelengths to arrange a structure in which two layers or three or more layers are overlapped, a cholesteric liquid crystal layer which can reflect circular polarized light in a wide wavelength region of a visible light region, etc. can be obtained, thus providing transmission circular polarized light in a wide wavelength region.

Furthermore, a polarizing plate of the present invention can be formed by laminating a polarizing plate and two or at least three optical layers like the above-mentioned polarization separating type polarizing plate. Therefore, the polarizing plate can be the above-mentioned reflective polarizing plate, a reflective elliptical polarizing plate, which is prepared by combining a semitransparent polarizing plate and a retardation plate or a semitransparent elliptical polarizing plate etc. An optical member including a lamination of two or three or more optical layers can also be formed by using a method of laminating layers separately in a certain order in a manufacturing process of a liquid crystal display etc. However, by previously laminating optical layers as optical members, an optical member has excellent stability in quality and assembling operability, and there is an advantage that efficiency in manufacturing liquid crystal displays can be improved. Any appropriate adhesion means such as an adhesive layer can be used for the lamination.

The adhesive layer can be provided on a polarizing plate and an optical member for adhesion with other members such as a liquid crystal cell, etc. The adhesive layer can with formed with by conventional appropriate adhesives such as an acrylic adhesive. Particularly, adhesives having a low moisture absorption coefficient and an excellent heat resistance is preferred from aspects of prevention of foaming or peeling caused by moisture absorption, prevention of deterioration of the optical properties and warping of a liquid crystal cell caused by difference in thermal expansion coefficients, etc., formation of a high quality liquid crystal display having excellent durability, etc. Moreover, the adhesive layer can contain fine particles to obtain optical diffusivity. The adhesive layers can be provided on necessary surfaces as required. For example, the protective layer of the polarizing plate of the present invention including a polarizer and a protective layer can be provided with an adhesive layer on one surface or both surfaces of the protective layer as required.

When an adhesive layer provided on the polarizing plate and the optical member is exposed on the surface, it is preferable that the adhesive layer is temporarily covered with a separator to prevent contamination until the adhesive layer is used. The separator can be formed of an appropriate thin sheet such as the above-mentioned transparent protective film, etc. As required, the transparent protective film can be provided with a peeling agent such as a silicone-based peeling agent, a long-chain alkyl-based peeling agent, a fluorine-based peeling agent, a peeling agent including molybdenum sulfide, or the like.

Furthermore, various layers forming the above-mentioned polarizing plate and an optical member, such as a polarizing film, a transparent protective film, an optical layer, and an adhesive layer can have ultraviolet absorption power by treating appropriately with an ultraviolet absorber such as an ester salicylate compound, a benzophenone compound, a benzotriazole compound, a cyanoacrylate compound, a nickel complex salt compound, and the like.

The optical compensating film and the polarizing plate of the present invention can preferably be used for formation of various apparatuses such as a liquid crystal display. The liquid crystal display can be produced as conventionally known appropriate structures such as transmission type, reflection type, or a transmission-reflection type by arranging the polarizing plates on one side or both sides of a liquid cell. Therefore, the liquid crystal cell forming the liquid crystal display can be selected arbitrarily from appropriate types of cells such as an active matrix driving type like a thin film transistor, a simple matrix driving type like a twist nematic type and a super twist nematic type.

Furthermore, when polarizing plates or optical members are provided on both sides of the liquid crystal cell, the polarizing plates or the optical members on both sides can be the same or different. Moreover, for forming a liquid crystal display, one layer or two or more layers of appropriate members such as a prism array sheet, a lens array sheet, an optical diffuser, and a backlight can be arranged at appropriate positions.

Hereinafter, the present invention will be explained with reference to Example and Comparative Example. Furthermore, the present invention is not limited to the below-mentioned Examples alone.

EXAMPLE 1

A transparent film base material was obtained by stretching a norbornene-based resin film and orienting it uniaxially to 1.85 times and 1.30 times an original length respectively at 175° C. by using a roll stretching machine. The obtained norbornene-based resin film had a thickness of 90 μm and values of the retardation is $\lambda/2$ and $\lambda/4$, respectively. The top surface of this transparent film base material was subjected to a corona discharge treatment at discharge frequency of 40 kHz, and the discharge amount of 0.1 kV·A·min/m2. An acrylic adhesive was coated onto the surface of the above-treated film and then dried. Thus, an adhesion-processed optical compensating film of the present invention was prepared.

As the norbornene-based resin, ARTON produced by JSR Co., Ltd. was used. This resin film was obtained by allowing the ARTON resin to be dissolved and filtered, followed by molding and solidifying in a form of a film.

The acrylic adhesive was prepared by dissolving 100 parts by weight of butyl acrylate, 0.1 parts by weight of 2-hydroxyethyl acrylate and 0.5 parts by weight of azobisisobutyronitrile in ethyl acetate to the monomer concentration of 50% and polymerized at 60° C. for 8 hours. With respect to 100 parts by weight of a solid part of the polymer solution, 0.2 parts by weight of an isocyanate crosslinking agent (Coronate L produced by Nippon Polyurethane Industry Co., Ltd.) was arranged to form a syrup. The resultant syrup was applied onto the surface to the thickness of 20 μm in a dried state. A creep amount at the temperature of 50° C. was 1 μm.

COMPARATIVE EXAMPLE 1

An optical compensating film of comparative example was produced by the same method as in the above mentioned Example 1 except that the corona discharge treatment was not carried out.

(Evaluation Test)

Adhesive force between the acrylic adhesive layer and the surface of the base material of the optical compensating film that had been obtained in Example 1 and Comparative Example 1 was measured. In the measurement, first of all, an ITO (indium tin oxide) was vapor deposited to the thickness of 0.2 μm on the surface of a 125 μm-thick PET film, and the vapor-deposited film was adhered onto the adhesive surface of the optical compensating film. Then an acrylic adhesive was peeled off from the base material of the optical compensating film. When the film was peeled off, the peeling strength was measured. In other words, when the PET film was drawn at the drawing angle of 180° at drawing speed of 300 mm/min by using a Tensilon, the adhesive force was measured. Table 1 shows the results. As is apparent from Table 1, the adhesive force of the optical compensating film of Example 1 was extremely larger than that of Comparative Example 1.

TABLE 1

|  | adhesive force (N/20 mm) | durability |
| --- | --- | --- |
| Example 1 | 15.8 | excellent |
| Comparative Example 1 | 8.2 | peeling occurs on the periphery |

A sample for the durability test (300 mm×250 mm) was prepared by adhering a liquid cell, the optical compensating film that had been obtained in Example 1 or Comparative Example 1, and polarizing plate on a glass substrate in this order from the lower part via an adhesive; and subjecting the samples to an autoclave treatment, that is, pressing the samples under atmosphere at a temperature of 50° C. at a pressure of 0.5 MPa and allow the samples to stand for 20 minutes. These samples were allowed to stand at 80° C. for 500 hours and 60° C. at the humidity of 90% for 500 hours to test the durability and to observe the appearance. Table 1 shows the results. As is apparent from Table 1, the thermal resistance and humidity resistance in the case of using the optical compensating film of Example 1 was excellent as compared with that of Comparative Example 1.

As explained above, according to the present invention, an optical compensating film formed by coating an adhesive onto a norbornene-based resin film, wherein the adhesive force between the optical compensating film and the adhesive layer is set to be 10 N/20 mm or more, thus making it possible to provide a liquid crystal display having a high durability and a high optical property.

The embodiments explained above are to be intended to clarify the subject matter of the art of the invention and are not limited to the above-mentioned embodiments alone. The present invention should be considered broadly and all changes which come within the spirit of the invention and within the meaning and range of equivalency of the claims are intended to be embraced therein.

What is claimed is:

1. An optical compensating film comprising an adhesive layer having adhesive property on both sides and formed by coating the adhesive onto a stretched norbornene-based resin film,
wherein the adhesive strength between the adhesive layer and the stretched norbornene-based resin film is not smaller than 10 N/20 mm, and wherein the adhesive is an acrylic adhesive and the adhesive layer is disposed directly on the norbornene-based resin film.

2. The optical compensating film according to claim 1, wherein the norbornene-based resin film is subjected to a surface treatment and the adhesive layer is provided thereon.

3. The optical compensating film according to claim 2, wherein the surface treatment is a corona discharge treatment.

4. The optical compensating film according to claim 3, wherein in the corona discharge treatment, the discharge frequency is in the range from 50 Hz to 500 kHz and the discharge amount is in the range from 0.00 1 kV·A·min/m2 to 5 kV·A·min/m2.

5. The optical compensating film according to claim 1, wherein the thickness of the stretched norbornene-based resin film is in the range from 20 µm to 200 µm.

6. The optical compensating film according to claim 1, wherein the stretched norbornene-based resin film has been stretched by a stretching ratio in the range of from 1.01 to 10 times the original length.

7. A polarizing member comprising a polarizing plate and the optical compensating film of claim 1, wherein the optical compensating film is adhered to the polarizing plate via the adhesive layer.

8. A liquid crystal display comprising the optical compensating film of claim 1, and a polarizing plate, wherein the polarizing plate is adhered to the optical compensating film via the adhesive layer.

9. A method for producing an optical compensating film formed by coating an adhesive onto a stretched norbornene-based resin film, the method comprising subjecting the stretched norbornene-based resin film to a surface treatment and coating an acrylic adhesive having adhesive property on both sides directly onto the surface-treated stretched norbornene-based resin film, and setting the adhesive strength between the adhesive layer and the stretched norbornene-based resin film to be 10 N/20 mm or more.

10. The method for producing an optical compensating film according to claim 9, wherein the surface treatment is a corona discharge treatment.

11. The method for producing an optical compensating film according to claim 9, wherein the thickness of the stretched norbornene-based resin film is in the range from 20 µm to 200 µm.

12. The method for producing an optical compensating film according to claim 9, wherein the stretched norbornene-based resin film has been stretched by a stretching ratio of from 1.01 times to 10 times the original length.

* * * * *